United States Patent [19]

Nakaya et al.

[11] Patent Number: 4,982,485

[45] Date of Patent: Jan. 8, 1991

[54] METHOD OF MANUFACTURING MONOLITHIC CERAMIC CAPACITOR

[75] Inventors: Shunsuke Nakaya; Harunobu Sano; Yoshiaki Kohno, all of Kyoto, Japan

[73] Assignee: Murata Manufacturing Co., Ltd., Japan

[21] Appl. No.: 406,456

[22] Filed: Sep. 13, 1989

[30] Foreign Application Priority Data

Sep. 13, 1988 [JP] Japan ................... 63-230391

[51] Int. Cl.$^5$ ............................................. H01G 7/00
[52] U.S. Cl. ................................. 29/25.42; 361/321
[58] Field of Search .................... 29/25, 42; 361/308, 361/309, 310, 320, 321

[56] References Cited

U.S. PATENT DOCUMENTS 3,612,963 10/1971 Piper et al. .
4,353,153 10/1982 Prakash ............................... 29/25.42
4,604,676 8/1986 Senda et al. ......................... 361/309
4,811,162 3/1989 Maher et al. ........................ 29/25.42

FOREIGN PATENT DOCUMENTS 0183399 6/1986 European Pat. Off. .
0213989 11/1987 European Pat. Off. .
36748 3/1977 Japan ................... 29/25.42
106898 8/1979 Japan ................... 29/25.42

Primary Examiner—P. W. Echols
Attorney, Agent, or Firm—Ostrolenk, Faber, Gerb & Soffen

[57] ABSTRACT

A method of manufacturing a monolithic ceramic capacitor comprises forming a ceramic laminate body in which a plurality of inner electrodes are buried in layers and outer electrodes are formed on both end surfaces of the laminate body, and separated from said body by conductive ceramic films. In order to form the conductive ceramic films, a paste or a sheet of a conductive ceramic material is applied onto each end surface of the ceramic laminate body, and then fired.

9 Claims, 1 Drawing Sheet

METHOD OF MANUFACTURING MONOLITHIC CERAMIC CAPACITOR

BACKGROUND OF THE INVENTION

1. Field of the Invention

The present invention relates to a method of manufacturing a monolithic ceramic capacitor which comprises a ceramic laminate body having a plurality of inner electrodes buried therein in layers, and outer electrodes provided on both end surfaces of the ceramic body, and separated from the ceramic body by conductive ceramic films.

2. Description of the Background Art

A monolithic ceramic capacitor generally comprises a ceramic laminate body which is formed by alternately stacking dielectric ceramic layers and inner electrodes, and further comprises outer electrodes, which are mainly composed of silver, formed on both end surfaces of the ceramic laminate body, and electrically connected to the inner electrodes.

In general, solder is used to connect such a monolithic ceramic capacitor to an interconnection substrate such as a printed circuit board, the solder being adhered onto the outer electrodes to attain connection with the interconnection substrate.

However, it has been recognized by a reliability test that the electrical properties of the monolithic ceramic capacitor are impaired by soldering due to various causes including: movement of a metal, particularly tin, contained in molten solder toward the inner electrode layers; electrochemical reaction; and the like. That is, solder is mainly prepared from tin, which is generally easily alloyed with various metals, whereby the use of solder causes a phenomenon wherein an intermetallic compound is formed with the outer electrodes. Part of such an intermetallic compound gradually diffuses into the monolithic ceramic capacitor with time, through diffusion paths of the inner electrodes, or interfaces between the inner electrodes and the dielectric ceramic layers. This causes the electrical properties, such as insulation resistance, for example, of the capacitor to be extremely reduced. Accordingly, it would be desirable to develop a highly reliable monolithic ceramic capacitor, which can prevent any of the elements which make up the solder (when solder is to be solder employed for connecting the capacitor to an interconnection substrate) from diffusion into or around the inner electrodes, thereby to prevent deterioration of the electrical properties of the capacitor.

U.S. Pat. No. 4,604,676 in the name of the assignee discloses a monolithic ceramic capacitor which has conductive ceramic films (conductive metal oxide layers) formed between both end surfaces of a ceramic laminate body and outer electrodes. According to this '676 patent, the conductive ceramic films are adapted to prevent deterioration of electrical properties, particularly insulation resistance, by preventing reduction of the dielectric ceramic material caused by the outer electrodes. The presence of such conductive ceramic films also prevents the elements in solder from diffusion into or around the inner electrodes.

That is, due to interposition of the conductive ceramic films, the inner and outer electrodes, which are electrically connected with each other, are structurally separated by conductive ceramic films having a low metal diffusion coefficient. Thus, even if there is a chance for the solder to be in contact with the outer electrodes, the elements, mainly tin, forming the solder, are prevented from diffusion into or around the inner electrodes. Thus, the electrical properties of the laminated ceramic capacitor are stably maintained.

However, the aforementioned '676 patent discloses only the use of a thin film forming method, such as sputtering, as a method of forming the conductive ceramic films. In order to form the conductive ceramic films in specific regions such as the surface parts of the ceramic laminate body, in order to expose the inner electrodes, masks as well as high-priced equipment such as a sputtering apparatus are required. Further, a relatively long time is required to form the conductive ceramic films. Thus, the overall cost of obtaining this prior art monolithic ceramic capacitor is increased.

SUMMARY OF THE INVENTION

Accordingly, an object of the present invention is to provide a manufacturing method which can more efficiently obtain a monolithic ceramic capacitor comprising the aforementioned conductive ceramic films, and at a lower cost.

A method of manufacturing a monolithic ceramic capacitor according to the present invention comprises a step of preparing a ceramic laminate body having first and second end surfaces which are opposite to each other, and first and second inner electrodes which are arranged in parallel in the ceramic laminate body and exposed on the first and second end surfaces respectively. Conductive ceramic films are formed by firing on respective ones of the first and second end surfaces of the ceramic laminate body. The step of forming such conductive ceramic films may be carried out after the step of firing the ceramic laminate body or simultaneously with the said step. Outer electrodes are formed on the conductive ceramic films obtained in the aforementioned manner.

When the step of firing the ceramic laminate body is carried out before the step of forming the conductive ceramic films, the conductive ceramic films are prepared preferably from a ceramic conductive material which can be fired at a temperature lower than the firing temperature of the ceramic laminate body.

The conductive ceramic material for the conductive ceramic films preferably contains at least one element selected from the group consisting of $La_2O_3$, $SrCO_3$ and $MnCO_3$.

In order to form the conductive ceramic films, paste containing the conductive ceramic material is applied to the first and second end surfaces of the ceramic laminate body, or sheets containing the conductive ceramic material are adhered thereto.

Thus, according to the present invention, the conductive ceramic films are obtained by applying the conductive ceramic material onto prescribed regions of the ceramic laminate body and firing the same. Such a technique of firing the ceramic material is also employed for firing the ceramic laminate, for example, in order to obtain a monolithic ceramic capacitor. Thus, the monolithic ceramic capacitor according to the present invention can be obtained by employing only a firing technique which is substantially identical to that by which the most general monolithic ceramic capacitor is obtained. According to the present invention, therefore, no specific additional apparatus or equipment is required for obtaining a monolithic ceramic capacitor, and the manufacturing work can be efficiently performed. Further, the conductive ceramic films are completely formed by firing in a shorter period of time as compared with the aforementioned thin film forming method. This also contributes to improvement in efficiency. Thus, the overall cost for the monolithic ceramic capacitor can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
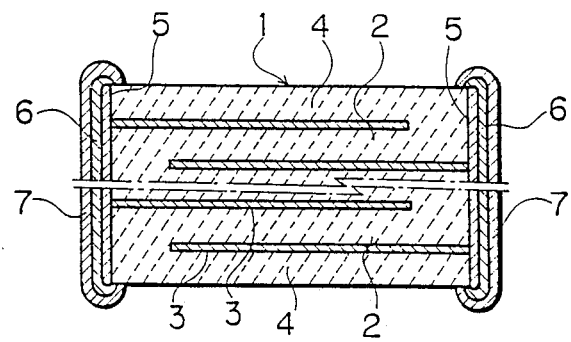
FIG. 1 is a sectional view showing a monolithic ceramic capacitor obtained according to an embodiment of the present invention.

Referring to FIG. 1, a monolithic ceramic capacitor comprises a ceramic laminate body 1 which is formed by stacking a plurality of dielectric ceramic layers 2 having inner electrodes 3 between them. Outer electrodes 6 are formed on both end surfaces of the ceramic laminate body 1 separated by conductive ceramic films 5. Solder plating films 7 may be formed on the outer electrodes 6. The monolithic ceramic capacitor is a chip type capacitor, i.e., it has no leads, and is in the form of a rectangular parallelepiped.

The steps of manufacturing this capacitor are now described.

Figure 2:
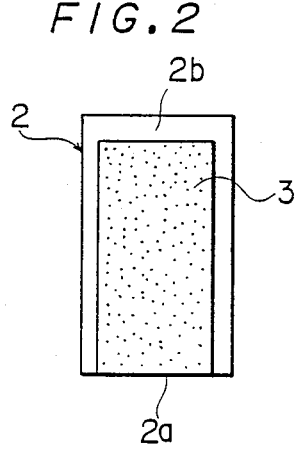
FIG. 2 is a plan view showing a dielectric ceramic layer included in the monolithic ceramic capacitor shown in FIG. 1.
Figure 3:
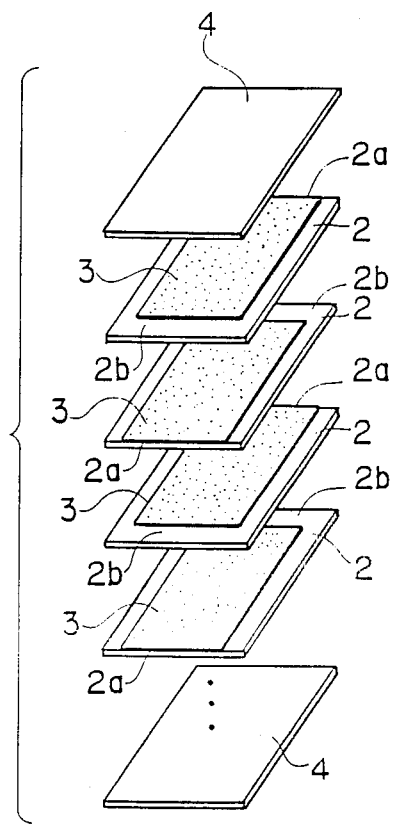
FIG. 3 is an exploded perspective view illustrating the ceramic laminate body shown in FIG. 1.

First, the ceramic laminate body 1 is prepared. As shown in FIG. 2, the ceramic laminate body 1 is formed from a dielectric ceramic layer (green sheet) 2 which is obtained by slurrying material powder and extending the slurry into the form of a sheet, and an inner electrode 3 which is formed by applying Pd paste onto one surface of the dielectric ceramic layer 2. A required number of such dielectric ceramic layers 2 having the inner electrodes 3 are stacked and held between top and bottom dielectric ceramic layers 4 having no inner electrodes 3, as shown in FIG. 3. This laminate is compressed, cut and fired, thereby to obtain the ceramic laminate body 1.

Then, both end surfaces of the ceramic laminate body 1 are covered with the conductive ceramic films 5, as hereafter described in detail. The conductive ceramic films 5 may be formed by applying a paste which is prepared by mixing glass frit into $La_2O_3$, $SrCO_3$ or $MnCO_3$, for example, onto both end surfaces of the ceramic laminate body 1 and firing the same at a prescribed temperature. Alternatively, in order to form the conductive ceramic films 5, sheets containing such a conductive ceramic material may be adhered onto both end surfaces of the ceramic laminate 1.

Then, the outer electrodes 6 are formed on the respective conductive ceramic films 5. The outer electrodes 6 are formed by applying conductive paste containing powder of a metal such as silver onto the conductive ceramic films 5 and firing the same. Thereafter the solder plating films 7 are formed on the outer electrodes 6 by solder plating, thereby to obtain the chip-type monolithic capacitor.

In more concrete terms, PVA (polyvinyl alcohol) serving as a binder is added to a mixture of 63 mole percent of $Nd_2Ti_2O_7$, 14 mole percent of $BaTiO_3$ and 23 mole percent of $TiO_2$, and kneaded with addition of a surface active agent, a dispersing agent and water to obtain a slurry, in order to prepare green sheets for forming the dielectric ceramic layers 2. Then, the slurry is shaped into a sheet by the doctor blade coater, thereby to form a green sheet of 35 μm in thickness. Thereafter Pd paste is printed on a surface of the green sheet by screen printing, to form an inner electrode 3 (see FIG. 2). A plurality of such green sheets having the inner electrodes 3 are stacked to provide the required electrostatic capacitance. In this case, the green sheets are so stacked as to alternately arrange their edges 2a which are flush with first ends of the inner electrodes 3 and their edges 2b extending beyond second ends of the inner electrodes 3 (see FIG. 3), and thereafter compressed under heating. According to this embodiment, 11 green sheets having the inner electrodes 3 are stacked, and this laminate is cut to form a chip of 7 mm by 5 mm, which in turn is fired in the air at 1250° C.

Then, the conductive ceramic films 5 are formed on the end surfaces of the fired ceramic laminate body 1. A conductive ceramic material for the conductive ceramic films 5 is prepared by adding glass frit to a mixture of 34 mole percent of $La_2O_3$, 15 mole percent of $SrCO_3$ and 51 mole percent of $MnCO_3$ and pasting the mixture. This paste is applied to both end surfaces of the ceramic laminate body 1, and fired in the air at 1200° C.

Then, the outer electrodes 6 are formed on the conductive ceramic films by applying silver paste and baking the same at 820° C. Thereafter the solder plating films 7 are formed on the outer electrodes 6, thereby to obtain the monolithic ceramic capacitor shown in FIG. 1.

In order to measure the electrical reliability of the monolithic ceramic capacitor manufactured in the aforementioned manner, a reliability test was performed under the same conditions on an Example of the present invention and on a reference example. The reference example was a monolithic ceramic capacitor, which was different from the inventive capacitor only in a point that no conductive ceramic films were provided. In more concrete terms, initial insulation resistance values of the respective samples were measured and then a high-temperature accelerated load life test was performed by leaving the samples under a temperature of 150° C. with application of voltage of 50 V for 2000 hours. Then, insulation resistance values were measured after a lapse of 2000 hours.

The following Table shows the results of measurement in the aforementioned test:

TABLE

|  | Initial Insulation Resistance (Ω) | Insulation Resistance after 2000 hours (Ω) |
| --- | --- | --- |
| Example | $1 \times 10^{11}$ | $8 \times 10^{10}$ |
| Reference Example | $1 \times 10^{11}$ | below $1 \times 10^4$ |

As understood from the above Table, the insulation resistance (IR) of the reference example was deteriorated to below $1 \times 10^4$ after the high-temperature accelerated load life test, while the insulation resistance (IR) of the inventive monolithic ceramic capacitor was not much reduced, and thus it has been shown that the inventive capacitor is highly reliable.

In other words, it can be evaluated that, in the monolithic laminated ceramic capacitor according to the present invention, despite the great diffusing power of the tin contained in the solder plating films 7, which are in contact with the outer electrodes 6, that tin hardly reached the inner electrodes 3 or portions around the same because of the interposition of the conductive ceramic films 5 between the ceramic laminate body 1 and the outer electrodes 6 as hereinabove described. Thus, the electrical properties of the ceramic laminate body 1 forming the inventive capacitor are stably maintained.

The inventive manufacturing method of a monolithic ceramic capacitor is not restricted to the aforementioned embodiment, but can be modified in various ways within the scope of the present invention.

For example, although the step of forming the conductive ceramic films 5 is carried out after firing of the ceramic laminate body 1 in the above embodiment, the ceramic laminate body can also be simultaneously fired with the conductive ceramic films.

While the solder plating films 7 were formed in order to provide improved wettability of the solder, nickel-tin layers, nickel-solder layers, copper-tin layers and copper-solder layers may also be formed on the outer electrodes 6 in order to also prevent silver leaching of the outer electrodes 6.

Although an example of the present invention has been described and illustrated in detail, it is clearly understood that the same is by way of illustration and example only and is not to be taken by way of limitation, the scope of the present invention being limited only by the terms of the appended claims.

We claim:

1. A method of manufacturing a monolithic ceramic capacitor, comprising the steps of:
    preparing a ceramic laminate body having first and second end surface which are opposite to each other, and having first and second inner electrodes arranged therein in parallel with each other, said first and second inner electrodes being exposed to receive an electrical connection at said first and second end surfaces respectively;
    firing said ceramic laminate body;
    forming respective conductive ceramic films on said first and second end surfaces of said ceramic laminate by firing, said ceramic films including a conductive ceramic material containing at least one element selected from the group consisting of $La_2O_3$, $SrCO_3$ and $MnCO_3$; and
    forming respective outer electrodes on said conductive ceramic films.

2. A manufacturing method in accordance with claim 1, wherein said step of firing said ceramic laminate body is carried out before said step of forming said conductive ceramic films.

3. A manufacturing method in accordance with claim 2, wherein a conductive material for said conductive ceramic films is prepared from a material which can be fired at a temperature lower than the firing temperature of said ceramic laminate body.

4. A manufacturing method in accordance with claim 1, wherein said step of firing said ceramic laminate body is carried out simultaneously with the firing step included in said step of forming said conductive ceramic films.

5. A manufacturing method in accordance with claim 1, wherein said step of forming said conductive ceramic films comprises steps of applying paste containing a conductive ceramic material onto said first and second end surfaces and then firing the same.

6. A manufacturing method in accordance with claim 1, wherein said step of forming said conductive ceramic films comprises steps of adhering sheets containing a conductive ceramic material onto said first and second end surfaces and then firing the same.

7. A method of manufacturing a monolithic ceramic capacitor, comprising the steps of:
    preparing a ceramic laminate body having first and second end surfaces which are opposite to each other, and having first and second inner electrodes arranged therein in parallel with each other, said first and second inner electrodes being exposed to receive an electrical connection at said first and second end surfaces respectively;
    firing said ceramic laminate body;
    forming a conductive ceramic paste;
    applying said conductive ceramic paste on said first and second end surfaces of said ceramic laminate;
    firing said ceramic laminate to form respective ceramic films on said first and second end surfaces of said ceramic laminate; and
    forming respective outer electrodes on said conductive ceramic films.

8. A manufacturing method in accordance with claim 7, wherein said conductive ceramic paste is formed by adding a mixture of $La_2O_3$, $SrCO_3$ and $MnCO_3$.

9. A manufacturing method in accordance with claim 8, wherein said conductive ceramic paste is formed by adding a glass frit.

* * * * *